(12) United States Patent
Furick

(10) Patent No.: US 9,338,873 B1
(45) Date of Patent: May 10, 2016

(54) MESH SCREEN ASSEMBLY AND SHIELD CUP FOR A GAS SHIELDED ELECTRIC ARC TORCH

(71) Applicant: Michael Furick, Mooresville, NC (US)

(72) Inventor: Michael Furick, Mooresville, NC (US)

(*) Notice: Subject to any disclaimer, the term of this patent is extended or adjusted under 35 U.S.C. 154(b) by 0 days.

(21) Appl. No.: 14/797,545

(22) Filed: Jul. 13, 2015

(51) Int. Cl.
*B23K 10/00* (2006.01)
*H05H 1/34* (2006.01)
*B23K 9/29* (2006.01)

(52) U.S. Cl.
CPC . *H05H 1/34* (2013.01); *B23K 9/291* (2013.01)

(58) Field of Classification Search
CPC .......... B23K 10/00; B23K 9/291; H05H 1/34; H05H 1/26
USPC ............... 219/121.48, 121.51, 121.5, 74, 75, 219/137.42, 137 R, 136
See application file for complete search history.

(56) References Cited

U.S. PATENT DOCUMENTS

| | | | | |
|---|---|---|---|---|
| 3,053,968 | A * | 9/1962 | Gorman | B23K 9/167 210/510.1 |
| 3,180,967 | A * | 4/1965 | Hill | B23K 9/291 219/75 |
| 4,788,401 | A * | 11/1988 | Kleppen | B23K 9/296 219/137.42 |
| 5,003,150 | A * | 3/1991 | Stricklen | B23K 9/167 219/136 |
| 5,772,102 | A | 6/1998 | New et al. | |
| 6,525,288 | B2 | 2/2003 | Rehrig | |
| 8,809,723 | B2 | 8/2014 | Fessl et al. | |
| 9,095,922 | B1 * | 8/2015 | Shearin | B23K 9/173 |
| 9,145,832 | B2 * | 9/2015 | Comon | B23K 9/16 |

* cited by examiner

*Primary Examiner* — Mark Paschall
(74) *Attorney, Agent, or Firm* — Schwartz Law Firm, P.C.

(57) ABSTRACT

A gas diffusion screen assembly is adapted for residing in a torch cup of a gas shielded electric arc torch. The gas diffusion screen assembly comprises a first concave mesh screen, a second convex mesh screen, and an electrode collar. The collar interconnects the first and second mesh screens, and defines an opening for receiving an electrode of the electric arc torch.

20 Claims, 4 Drawing Sheets

MESH SCREEN ASSEMBLY AND SHIELD CUP FOR A GAS SHIELDED ELECTRIC ARC TORCH

TECHNICAL FIELD AND BACKGROUND OF THE DISCLOSURE

The present disclosure relates broadly and generally to a mesh screen assembly and shield cup for a gas shielded electric arc torch (e.g. for welding or cutting).

Gas tungsten arc welding (GTAW), also known as tungsten inert gas (TIG) welding, is an arc welding process that uses a non-consumable tungsten electrode to produce the weld. The weld area is protected from atmospheric contamination by an inert shielding gas, such as argon or helium. A filler metal is also normally used, although some welds, known as autogenous welds, do not require it. A constant-current welding power supply produces electrical energy, which is conducted across the arc through a column of highly ionized gas and metal vapors known as a plasma.

Prior art GTAW torches may also utilize a gas lens which together with a collet helps hold the tungsten electrode in place, and creates the electrical contact necessary for proper current transfer. A typical gas lens comprises a copper and/or brass body with layered mesh screens of stainless steel. The gas lens functions to helps evenly distribute the shielding gas promoting a laminar flow around the tungsten and along the weld puddle and arc.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a gas diffusion screen assembly adapted for residing in a torch cup of a gas shielded electric arc torch (for welding or cutting). The screen assembly comprises a first concave mesh screen, a second convex mesh screen mirroring the concave screen, and an electrode collar. The collar interconnects the mirrored first and second mesh screens, and defines an opening for receiving an electrode of the electric arc torch. In alternative embodiments, the exemplary gas lens may comprise only one of either the concave mesh screen or convex mesh screen.

As used herein, the term "concave" means curved like the inner surface of a sphere; i.e., having an outline or surface that curves inward like the interior of a circle or sphere. The term "convex" means curved like the outer surface of a sphere; i.e., having a surface that is curved or rounded outward.

According to another exemplary embodiment, the first and second mesh screens are substantially dish shaped. The term "substantially dish shaped" is broadly defined herein to mean shaped like a symmetric or asymmetric dish, pan, hemisphere, or the like.

According to another exemplary embodiment, the first and second mesh screens are fabricated of a metal selected from a group consisting of steel (e.g., stainless), aluminum, copper, and brass.

According to another exemplary embodiment, the first and second mesh screens have a mesh size ranging from 20 ($\frac{1}{32}$") openings) to 40 ($\frac{1}{64}$") openings) or smaller.

According to another exemplary embodiment, the first and second mesh screens are each symmetrically formed.

According to another exemplary embodiment, the first and second mesh screen are designed to engage a cylindrical interior surface of the torch cup.

In another exemplary embodiment, the present disclosure comprises a torch cup for a gas shielded electric arc torch (for welding or cutting). The exemplary torch cup incorporates a gas diffusion screen assembly, as described herein, and may be fabricated of a heat-resistant and chemical-resistant glasswear, such as Pyrex®, or other substantially transparent material.

According to another exemplary embodiment, the torch cup comprises a transition O-ring located adjacent its inside surface, and residing between said first and second mesh screens. The transition O-ring may help position and retain the gas diffusion screen assembly, and substantially seal a generally annular space between the screen assembly and cup.

In yet another exemplary embodiment, the present disclosure comprises a gas shielded electric arc (e.g., plasma arc or gas tungsten arc) torch which incorporates a shield cup and gas diffusion screen assembly, as described herein. The exemplary torch may be used for welding or cutting, and may be handheld, industrial, or robotic.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figures 1, 2:
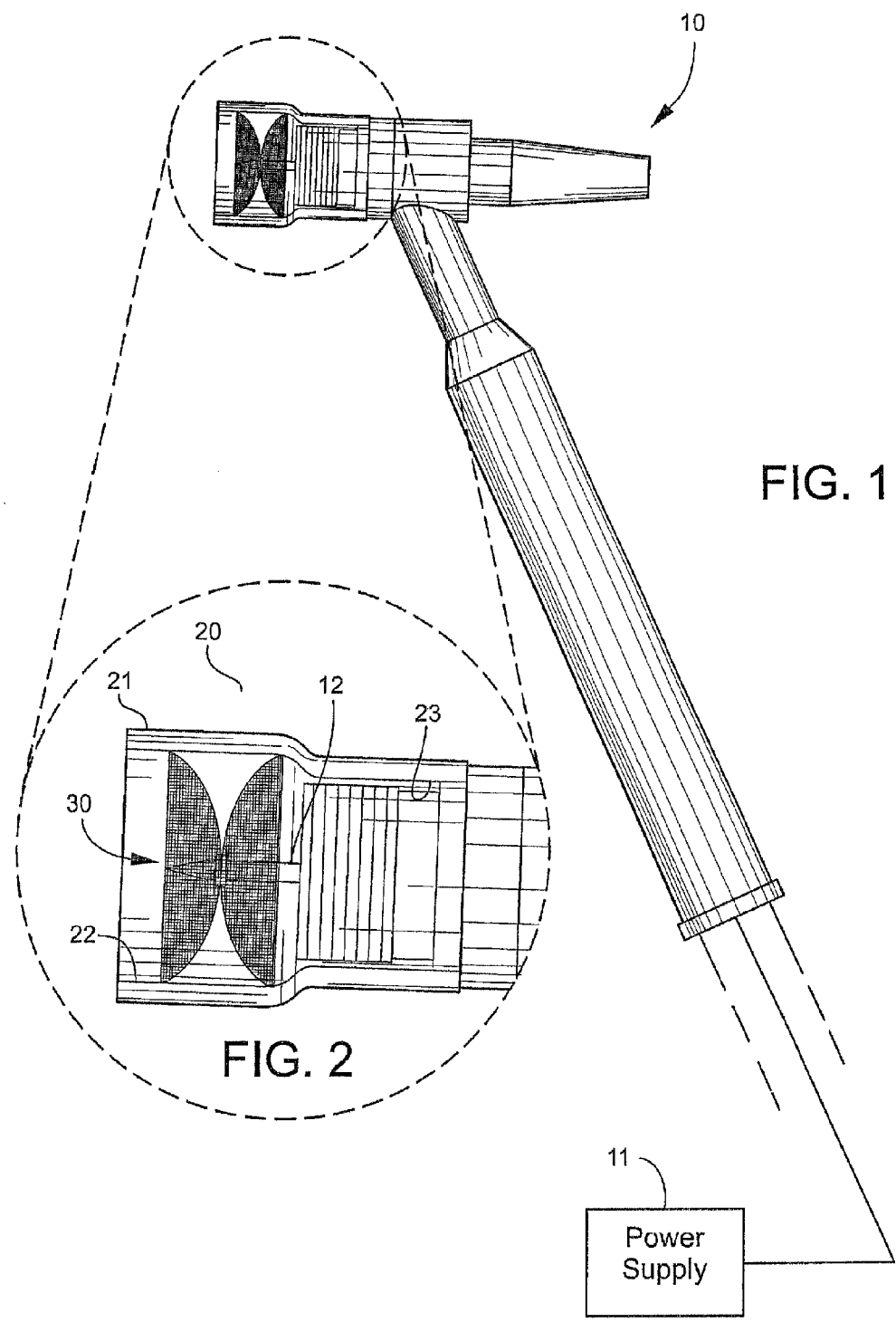
FIG. 1 is a view of a gas shielded electric arc hand torch incorporating an exchangeable shield cup according to one exemplary embodiment of the present disclosure.
FIG. 2 is an enlarged view of the exchangeable shield cup shown in FIG. 1.
Figure 3:
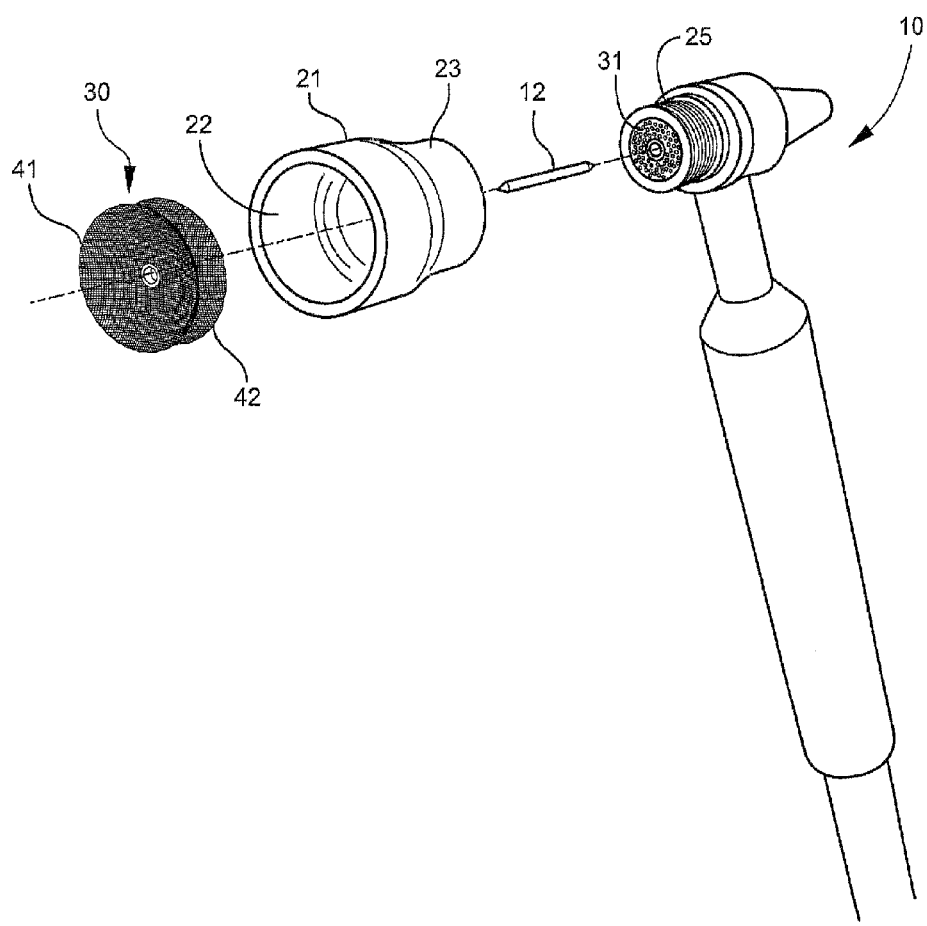
FIG. 3 is a perspective view of the exemplary hand torch and shield cup with parts of the shield cup exploded.

Referring now specifically to the drawings, a gas shielded electric arc hand torch incorporating an exchangeable shield cup according to one exemplary embodiment of the disclosure is illustrated in FIGS. 1, 2, and 3. The exemplary hand torch, shown broadly at reference numeral 10, is operatively connected to a main power supply 11 which converts AC line voltage into a user-adjustable, regulated and continuous DC current. The hand torch 10 contains a negatively charged tungsten electrode 12 which is mounted (via collet or other means) to the hand torch 10 and projects outwardly along a notional central axis inside the exemplary shield cup 20. The gas electrode 12 is adapted for generating an electric arc into a channel filled with "cutting" gas (e.g., for welding or cutting). The cutting gas heats up the electric arc and transforms it into plasma. A second type of gas, referred to as the "shielding" gas, is used to control the diameter or cut size of the plasma jet. The shielding gas may also have a cooling effect on the workpiece, thereby enabling more precise welding and sharp edge cutting.

Exemplary Shield Cup 20

The exemplary shield cup 20 comprises a hollow cup body 21 fabricated of a heat-resistant and chemical-resistant transparent glasswear, such as Pyrex®, and having opposing open distal and proximal ends 22, 23. The proximal end 23 has a relatively small diameter, and is designed to slide onto and frictionally engage (e.g., via rubber O-ring not shown) a gas lens collet body 25 of the hand torch 10. The open distal end 22 of the shield cup 10 has an outwardly flared enlarged diameter, and incorporates a gas diffusion screen assembly 30 designed to help evenly spread, smoothen, and uniformly distribute the shielding gas coverage around the tungsten electrode 12 and along the arc. The exemplary screen assembly 30 may cooperate with a gas lens 31 (FIG. 3) to reduce shielding gas turbulence and provide longer, undisturbed laminar flow of the gas to the weld pool. Exemplary gas lenses of the prior art are disclosed in prior U.S. Pat. Nos. 5,772,102, 6,525,288, and 8,809,723. The entire subject matter of these prior patents is incorporated herein by reference. In alternative embodiments, the exemplary shield cup 20 may be formed in a variety of materials, shapes, and sizes, and may be combined with a gas shielded electric arc torch which does not utilize a gas lens.

Figure 4:
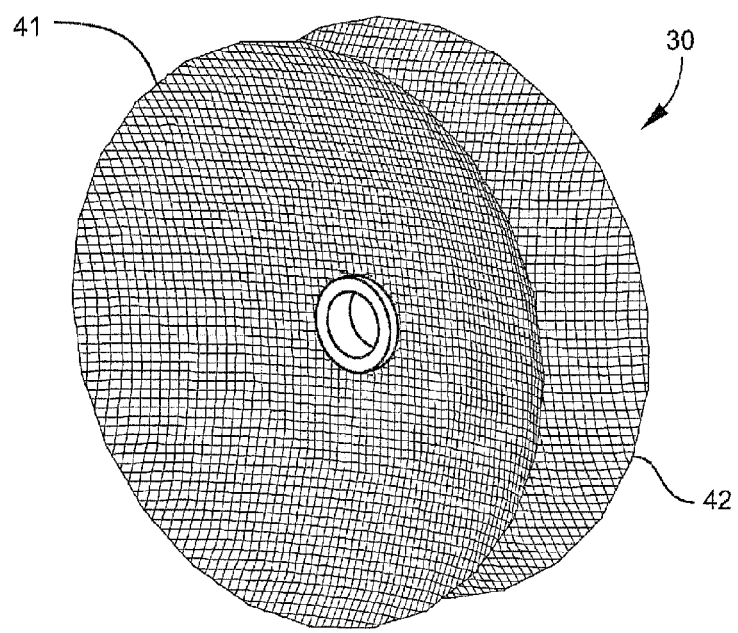
FIG. 4 is a perspective view of the exemplary gas diffusion screen assembly.
Figure 5:
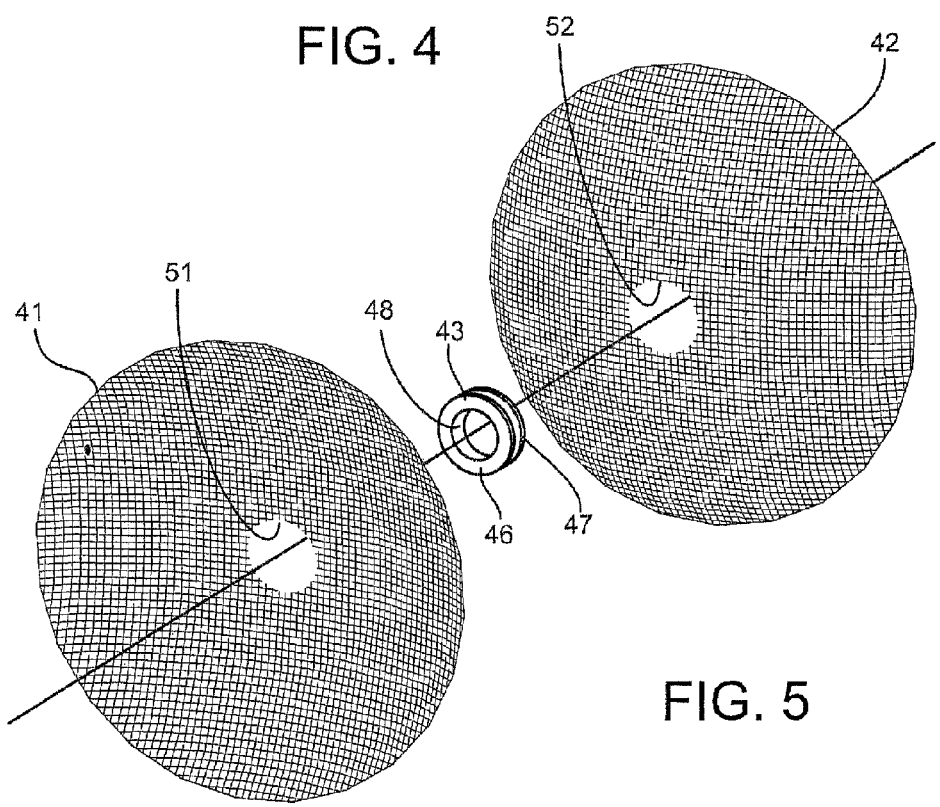
FIG. 5 is an exploded perspective view of the gas diffusion screen assembly.

As best shown in FIGS. 2, 4 and 5, the exemplary gas diffusion shield assembly 30 is positioned inside the cup body 21 and comprises a first concave dish-shaped mesh screen 41, a second convex dish-shaped mesh screen 42, and an electrode collar 43 centrally interconnecting the first and second screens 41, 42 at a tangent point. The exemplary collar 43 has spaced annular flanges 46, 47, best shown in FIG. 5, and a collar opening 48 through which the electrode 12 extends. The spaced flanges 46, 47 cooperate to hold the screens 41, 42 together at respective aligned screen openings 51, 52. The diameter of the collar opening 48 is only slightly larger than the diameter of the electrode 12. The mirrored mesh screens 41, 42 are each symmetrically formed, and designed to frictionally contact the inside cylindrical wall of the cup body 21 proximate its enlarged-diameter distal end 22. Each screen 41, 42 may be fabricated of a metal, such as stainless steel, aluminum, copper, or brass, and may have a mesh size ranging from 20 (1/32" openings) to 40 (1/64" openings). Alternatively, the screens 41, 42 may comprise any other metal or material capable of transmitting electricity, or other materials such as fabric or ceramic which may not transmit electricity. The mirrored arrangement of the two screens 41, 42 may help position and frictionally retain the assembly 30 inside the body 21 of shield cup 20.

Figure 6:
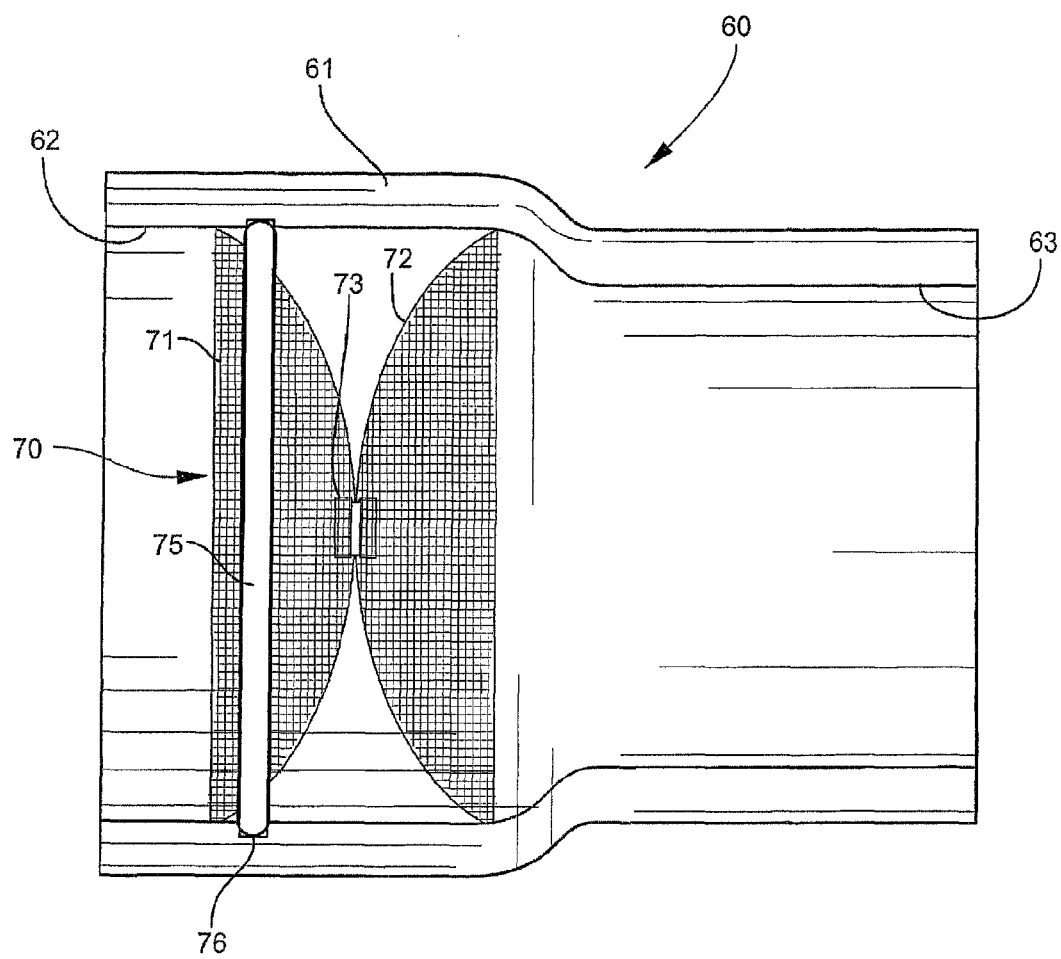
FIG. 6 is a view of an exchangeable shield cup according to an alternative exemplary embodiment of the present disclosure.

A further embodiment of the exemplary shield cup 60 is illustrated in FIG. 6. Like shield cup 20, the exemplary cup 60 comprises a hollow cup body 61 fabricated of a transparent glasswear, and having opposing open distal and proximal ends 62, 63. The proximal end 63 has a relatively small diameter, and is designed to slide onto and frictionally engage a gas lens collet body of the hand torch. The open distal end 62 of the shield cup 60 has an outwardly flared enlarged diameter, and incorporates a gas diffusion screen assembly 70. The screen assembly 70 is positioned inside the cup body 61, as previously described, and comprises a first concave dish-shaped mesh screen 71, a second convex dish-shaped mesh screen 72 mirroring the first screen 71, and an electrode collar 73 centrally interconnecting the first and second screens 71, 72 at a tangent point. In this embodiment, a rubber O-ring 75 (or metal retaining ring or the like) is located within an annular channel 76 formed with an inside of the cup body 61. The O-ring 75 resides between the first and second mesh screens 71, 72 to help position and frictionally retain the assembly 70 inside the cup body 61.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed:

1. A gas diffusion screen assembly adapted for residing in a torch cup of a gas shielded electric arc torch, said screen assembly comprising:
    a first concave mesh screen;
    a second convex mesh screen curved in a direction opposite said first concave mesh screen; and
    an electrode collar located between said first and second mesh screen and holding said first and second mesh screens together, and said first and second mesh screens and electrode collar defining respective aligned openings for receiving an electrode of the electric arc torch.

2. The gas diffusion screen assembly according to claim 1, wherein said first mesh screen is substantially dish shaped.

3. The gas diffusion screen assembly according to claim 2, wherein said first mesh screen is fabricated of a metal selected from a group consisting of steel, copper, and brass.

4. The gas diffusion screen assembly according to claim 3, wherein said first mesh screen has a mesh size ranging from 20 to 40.

5. The gas diffusion screen assembly according to claim 1, wherein said second mesh screen is substantially dish shaped.

6. The gas diffusion screen assembly according to claim 5, wherein said second mesh screen is fabricated of a metal selected from a group consisting of steel, aluminum, copper, and brass.

7. The gas diffusion screen assembly according to claim 6, wherein said second mesh screen has a mesh size ranging from 20 to 40.

8. The gas diffusion screen assembly according to claim 1, wherein said first and second mesh screens are each symmetrically formed.

9. The gas diffusion screen assembly according to claim 8, wherein said first and second mesh screen are designed to engage a cylindrical interior surface of the torch cup.

10. A torch cup for a gas shielded electric arc torch, said torch cup incorporating a gas diffusion screen assembly comprising:
    a first concave mesh screen residing inside said torch cup;
    a second convex mesh screen residing inside said torch cup, and curved in a direction opposite said first concave mesh screen; and
    an electrode collar located between said first and second mesh screen and holding said first and second mesh screens together, and said first and second mesh screens and electrode collar defining respective aligned openings for receiving an electrode of the electric arc torch.

11. The torch cup according to claim 10, wherein said first mesh screen is substantially dish shaped.

12. The torch cup according to claim 11, wherein said first mesh screen is fabricated of a metal selected from a group consisting of steel, aluminum, copper, and brass.

13. The torch cup according to claim 12, wherein said first mesh screen has a mesh size ranging from 20 to 40.

14. The torch cup according to claim 10, wherein said second mesh screen is substantially dish shaped.

15. The torch cup according to claim 14, wherein said second mesh screen is fabricated of a metal selected from a group consisting of steel, copper, and brass.

16. The torch cup according to claim 15, wherein said second mesh screen has a mesh size ranging from 20 to 40.

17. The torch cup according to claim 10, wherein said first and second mesh screens are each symmetrically formed.

18. The torch cup according to claim 17, wherein said first and second mesh screen are designed to engage a cylindrical interior surface of the torch cup.

19. The torch cup according to claim 10, and comprising a transition O-ring located adjacent an inside surface of said cup, and residing between said first and second mesh screens.

20. A torch cup for a gas shielded electric arc torch, said torch cup incorporating a gas diffusion screen assembly comprising:
    a first symmetrically-formed concave mesh screen residing inside said torch cup;
    a second symmetrically-formed convex mesh screen residing inside said torch cup, and mirroring said first mesh screen; and
    an electrode collar interconnecting said first and second mesh screens, and defining an opening for receiving an electrode of the electric arc torch.

\* \* \* \* \*